June 23, 1959 J. W. RIEKE 2,892,081

INSTANTANEOUS SIGNAL AMPLITUDE CLIPPER

Filed Nov. 18, 1953 3 Sheets-Sheet 1

INVENTOR
J. W. RIEKE
BY W. L. Kefauver
ATTORNEY

INVENTOR
J. W. RIEKE
BY W. L. Keefauver
ATTORNEY

June 23, 1959 J. W. RIEKE 2,892,081
INSTANTANEOUS SIGNAL AMPLITUDE CLIPPER
Filed Nov. 18, 1953 3 Sheets-Sheet 3

INVENTOR
J. W. RIEKE
BY W. L. Kerfauver
ATTORNEY 2,892,081
Patented June 23, 1959

2,892,081

INSTANTANEOUS SIGNAL AMPLITUDE CLIPPER

John W. Rieke, Basking Ridge, N.J., assignor to Bell Telephone Laboratories, Incorporated, New York, N.Y., a corporation of New York Application November 18, 1953, Serial No. 392,851
13 Claims. (Cl. 250—27)

This invention relates to circuits for handling signal waves, the amplitudes of which may vary, and is described below with reference to particular embodiments directed specifically to the instantaneous clipping or attenuation of signal excursions which exceed a prescribed level.

In the present-day standard black and white television signal, the picture content is represented by a video frequency wave varying in amplitude between two nominal voltage levels, one representing black and the other white, and all normal signals will lie within this range. Abnormal signals, however, are known to occur for several reasons, for example, from the pick-up of reflections from shiny objects, maladjustment of the input video signal level and also by circuit failures either in the television transmission circuits or in the subscriber's premises themselves.

"Blacker than black" surges can be controlled by clamping on the peaks of the synchronizing pulses which are initially established at a nominal "blacker than black" potential. "Whiter than white" surges, however, are not as easily dealt with an if tolerated may result in any of several undesired effects. They may, for example, produce bright spots on the subscriber's viewing screen which tend to "bloom" and become annoying. Also, in systems where the television signal is transmitted together with other signals such as telephone channels or other television signals over a common transmission medium, these surges may result in cross-talk by overloading repeaters.

An object of the invention, therefore, is to attenuate these surges and, in particular, to do so without disturbing signal components having amplitudes within the prescribed limits.

Another object of the invention is to increase the band width of amplitude clippers so that broad band surges of very short time duration may be attenuated without affecting normal signals.

Another object of the invention is an amplitude clipper which will attenuate abnormal amplitude surges even on low impedance transmission lines.

In accordance with an illustrative embodiment of the invention to be described in more detail below, abnormal signal excursions are clipped from a video signal at the television terminals without affecting signals below the prescribed limiting level. Clipping of these abnormal excursions is effected accurately regardless of the average energy content of the signals by a shunt feedback amplifier whose input is shunted across the video line. The feedback path of the amplifier is disabled for normal level signals, but abnormal signals permit the amplifier feedback to reduce its input impedance to a very low value which clips these signals by placing a low shunting impedance across the line.

A feature of the invention is that a broad band width is maintained in the clipper so that very sharp surges may be attenuated without impairing adjacent signals which do not exceed the limiting level.

Another feature of the invention is that the input impedance of the shunt clipper varies between a relatively high value for normal signals to a very low value for abnormal signals so that abnormal surges may be clipped even on a low impedance line such as a 124-ohm line without degrading normal signals.

Another feature of the invention is that the clipper responds to peak-to-peak amplitude variations and maintains a constant clipping level despite variations in the direct-current content of the video signal.

In describing the illustrative embodiments of the invention below, the term "clipper" is used in preference to "limiter" to connote a fast response-recovery time and to aid in distinguishing these circuits from envelope or volume control circuits.

Other objects and features of the invention may be better understood from a consideration of the following detailed description when read in accordance with the attached drawings, in which:

Fig. 1 is a functional diagram illustrating principles of the invention as applied to a balanced line;

Fig. 2 in a similar manner illustrates principles of the invention as applied to unbalanced lines;

Figure 1:
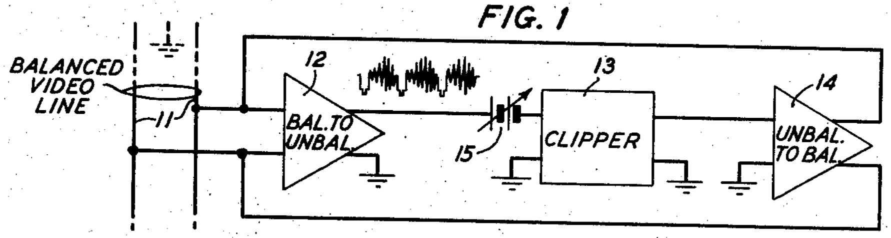

The broader aspects of the present invention can be appreciated by considering the functional diagram shown in Fig. 1. The number, 11, represents a video line balanced with respect to ground. To attenuate instantaneous amplitude surges of a video signal on the line 11, there is shunted across the line a "clipper" in the form of a shunt feedback amplifier having the output thereof connected to the input thereof exclusively and comprising a balanced-to-unbalanced amplifier 12, a biased clipper 13, and an unbalanced-to-balanced amplifier 14. The entire output of the latter amplifier is fed back in shunt relation to the input of amplifier 12.

One purpose of the amplifier 12 is to convert the video signal on line 11, balanced to ground, to an unbalanced signal with respect to ground with the synchronizing pulses at the input of the clipper 13 going negative. Another purpose is, together with amplifier 14, to provide the large broad band gain that is required. Bias provided by the battery 15 holds the clipper 13 cut off for all signals below the threshold level at which it is desired to limit amplitude excursions. For normal signals, therefore, there is no feedback from the amplifier 14 to the input of amplifier 12, and a high shunt impedance is maintained against the balanced line 11. Signal excursions at the bias point which exceed the bias below cut-off established by the battery 15 will be transmitted by the clipper 13 and provide shunt degenerative feedback to the input of the amplifier 12. In accordance with well-known feedback principles, such feedback tends to reduce the input impedance of the amplifier 12 so that in the presence of shunt feedback, the impedance bridged across the line 11 is reduced to a very small value, and abnormal signal excursions are thereby instantaneously attenuated. However, normal signal excursions are not affected by the above-described clipping circuit and are transmitted along line 11 past the shunt-connected clipper circuit.

Figure 2:
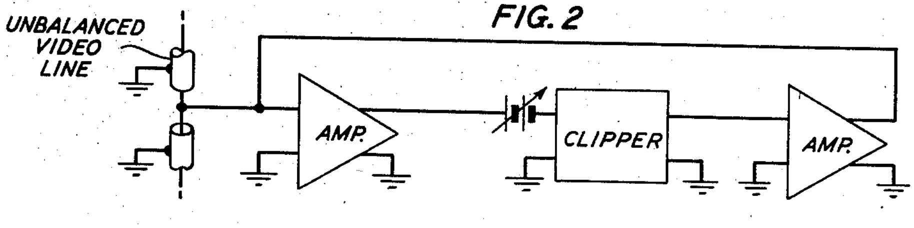

Although the broad aspects of the invention thus far described and to be described in the greater portion of the following description are related to balanced lines, principles of the invention are no less applicable to unbalanced lines, as illustrated in Fig. 2. In this instance, the circuit is somewhat simplified since balanced-to-unbalanced and unbalanced-to-balanced conversions are unnecessary. However, the specific circuits employed may be identical for balanced or unbalanced lines with the exception that if the line is unbalanced, one of the input leads to the initial amplifier 12 is grounded.

Figure 3:
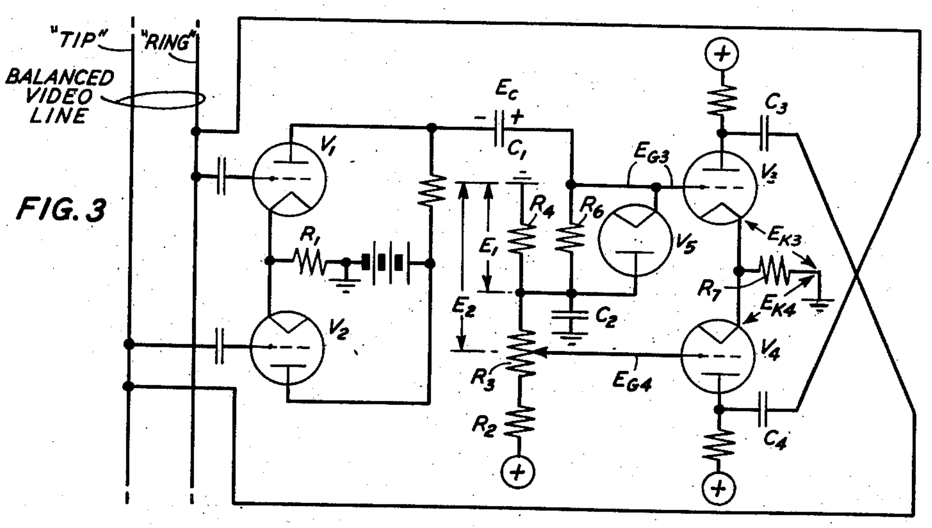
Fig. 3 is a circuit schematic diagram showing a simplified video clipper for a balanced line which employs principles of the invention; the diagram in Fig. 3A aids in understanding Fig. 3.

The simplified schematic diagram shown in Fig. 3 illustrates some of the salient features of the illustrative video clipper embodying the invention which will be described in more detail below. The input stage, V1 and V2, comprises the balanced-to-unbalanced amplifier and is quite similar to a circuit described in S. Doba, Jr. Patent 2,226,238, dated December 24, 1940. Triodes are illustrated for simplicity. The balanced signal is capacitively coupled to the grids of these two tubes. By convention, the "ring" side of the balanced video line is the side on which the synchronizing pulses go positive, and the "tip" side is the side on which the synchronizing pulses go negative. The grid of triode V1 is, therefore, connected to the "ring" side.

As described in more detail in the Doba patent, resistor $R_1$ serves to degenerate longitudinal currents by negative feedback. Briefly, balanced metallic currents drive stage V1 and V2 out of phase and for such signals there will be no appreciable potential drop across the resistor $R_1$. When, however, the input is due to a longitudinal current, the input voltages of stage V1 and V2 will have the same polarity with respect to ground and an appreciable potential drop will develop across resistor $R_1$. Further, this drop will be in phase with the input voltage applied to triode V1 and thereby degenerate the longitudinal amplification. Resistor $R_1$, therefore, supplies negative feedback for longitudinal voltages but has little or no effect on balanced metallic voltages.

The output signal from triode V1 applied to the coupling condenser $C_1$, therefore, comprises the video signal unbalanced with respect to ground with the synchronizing pulses going in the negative direction and with longitudinal components degenerated with respect to metallic currents. This signal is applied only to triode V3 and is by-passed to ground from triode V4 by condenser $C_2$.

The functions of the clipper 13 and of the unbalanced-to-balanced amplifier 14, illustrated separately in Fig. 1, are combined in the two triodes V3 and V4. A differential bias is applied to the grids of stage V3 and V4 by a voltage divider comprising resistors $R_2$, $R_3$, and $R_4$; resistor $R_3$ is provided with a variable tap to adjust the threshold level of limiting. The grid of triode V4 is more positive than the grid of triode V3 by an amount such that triode V4 conducts heavily and triode V3 is below cut-off. Triode V3 is cut off by the potential drop across resistor $R_7$, which couples the cathodes of stage V3 and V4.

Figure 3A:
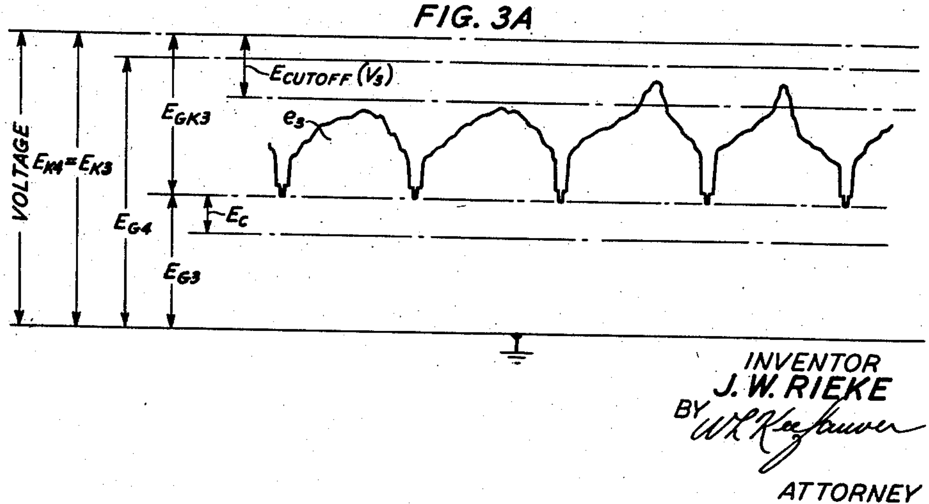

The diagram of Fig. 3A will aid in understanding the operation of this stage V3—V4. In this diagram, a representative video signal is illustrated with reference to the potentials $E_{G3}$ and $E_{G4}$ on the respective grids of stage V3 and V4, and the potentials $E_{K3}$ and $E_{K4}$ of the associated cathodes. Potential $E_{G3}$ is equal to the potential drop across resistor $R_4$, ($E_1$), and potential $E_{G4}$ is equal to the drop across resistor $R_4$ and a fraction of resistor $R_3$, ($E_2$). Since the cathodes are direct coupled, $E_{K3}=E_{K4}$ at a value slightly more positive than the grid potential of V4, which is heavily conducting.

But for the diode V5, the average value, instead of the synchronizing pulse peaks, of the video signals would be established potential $E_{G3}$ and the clipping level would be affected by the momentary brightness composition of the video wave. It is desired, however, to limit the peak-to-peak values of the wave independently of its composition. Since there is no static relation between the peak-to-peak and average values, the bias of triode V3 is established by the diode V5 and capacitor $C_1$ to be equal to $E_{G3}$ at the negative-most value of the wave form, namely, the peaks of the synchronizing pulses. In other words, the synchronizing pulse peaks are clamped at $E_{G3}$. The diode V5, which shunts resistor $R_6$, is a form of direct-current restorer or clamp and shifts the wave form positiveward by an amount $E_C$ which appears as additional charge on condenser $C_1$. Thus the clipper responds to positive-going signal excursions to limit the positive-going signal peaks with respect to the clamped, negative-going, synchronizing, pulse peaks, which effect is termed peak-to-peak clipping.

The negative bias on triode V3 is represented in Fig. 3A by $E_{GK3}$ and equals $E_{G3}-E_{K3}$, whereas the minimum negative bias voltage required to hold triode V3 cut off is represented as $E_{cutoff\ (V3)}$. So long as the peak-to-peak voltage of the video wave does not reduce the negative bias voltage $E_{GK3}$ to a value which is less than $E_{cutoff\ (V3)}$, triode V3 will remain cut off; and the stage comprising triodes V3 and V4 will have no gain and hence there will be no feedback to V1 and V2. Instantaneous positive-going signal surges which exceed the value $$E_{K3}-E_{cutoff\ (V3)}$$

will cause triode V3 to conduct and are coupled back degeneratively to stage V1 and V2 to reduce the terminal impedance at the inputs to these tubes.

From Fig. 3A it may be seen that the threshold level at which clipping takes place may be adjusted by varying $R_3$ which will vary the differential bias on stage V3 and V4.

Triode V3 will therefore conduct only in response to abnormal positive excursions on its grid. These same excursions appeared as negative swings on the grid of triode V1 and as positive swings on the grid triode V2. When triode V3 conducts, its plate potential will decrease and couple a negative voltage to the grid of triode V2 through coupling capacitor $C_3$. The conduction of triode V3 is also coupled to triode V4 by the common cathode resistor $R_7$ and appears as a positive swing at the triode V4 plate. This positive swing is coupled back to the grid of triode V1 by capacitor $C_4$. The feedback is, therefore, degenerative and, being shunt feedback, will decrease the input terminal impedance of stage V1—V2 to a very low value. To illustrate, this impedance can be reduced to one ohm or less so that substantial attenuation will occur even on low impedance (e.g., 124 ohms) lines.

Figure 4:
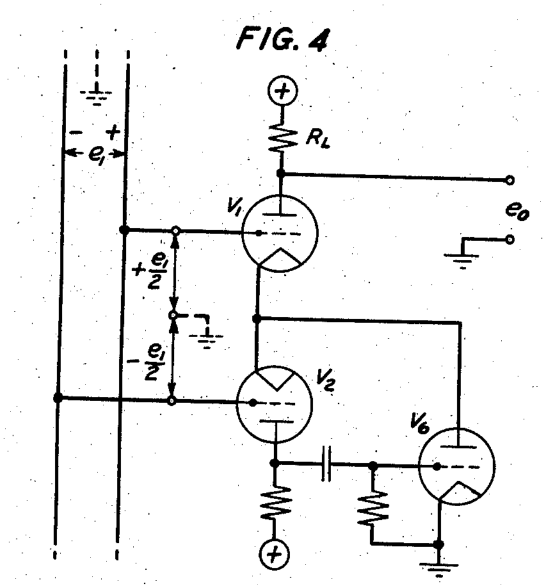
Fig. 4 is a simplified schematic diagram illustrating a modification of the circuit of Fig. 3.

Fig. 4 illustrates a possible modification of the Fig. 3 circuit whereby a 6-decibel loss in the balanced-to-unbalanced amplifier V1—V2 may be regained. This modification requires replacing the resistor $R_1$ in Fig. 3 with a triode V6.

Assume first that the triode V6 in Fig. 4 is replaced by a resistor $R_1$, as in Fig. 3, and that a balanced signal of $e_1$ volts is on the video line 11 with polarity as indicated. The cathodes of stage V1 and V2 will be at ground potential, assuming a perfectly balanced input signal. The net grid-cathode voltage of triode VI will be $$\frac{+e_1}{2}$$

the grid cathode voltage of triode V2 will be $$\frac{-e_1}{2}$$

and the output voltage will be $e_1=\frac{1}{2}e_1g_mR_L$. Triode V2, therefore, represents a 6-decibel voltage sacrifice in order to cancel longitudinal currents, as indicated by the factor 1/2.

By replacing $R_1$ with the tube V6, as in Fig. 4, this loss is averted. From Fig. 4 it may be seen that the plate voltage of triode V2, which is out of phase with its grid voltage, is coupled to the grid of triode V6 and, with a phase reversal, through the plate of triode V6 back to the cathode of triode V2. By means of this feedback loop, the cathode of triode V2 will attempt to reach the potential of its grid, namely, $$\frac{-e_1}{2}$$

and since the cathodes of stage V1 and V2 are coupled together, the net grid-cathode voltage of triode V1 will approach the full signal voltage of $+e_1$ with a resultant $e_0=e_1g_mR_L$. The 6-decibel loss is thereby recovered.

Figure 5:
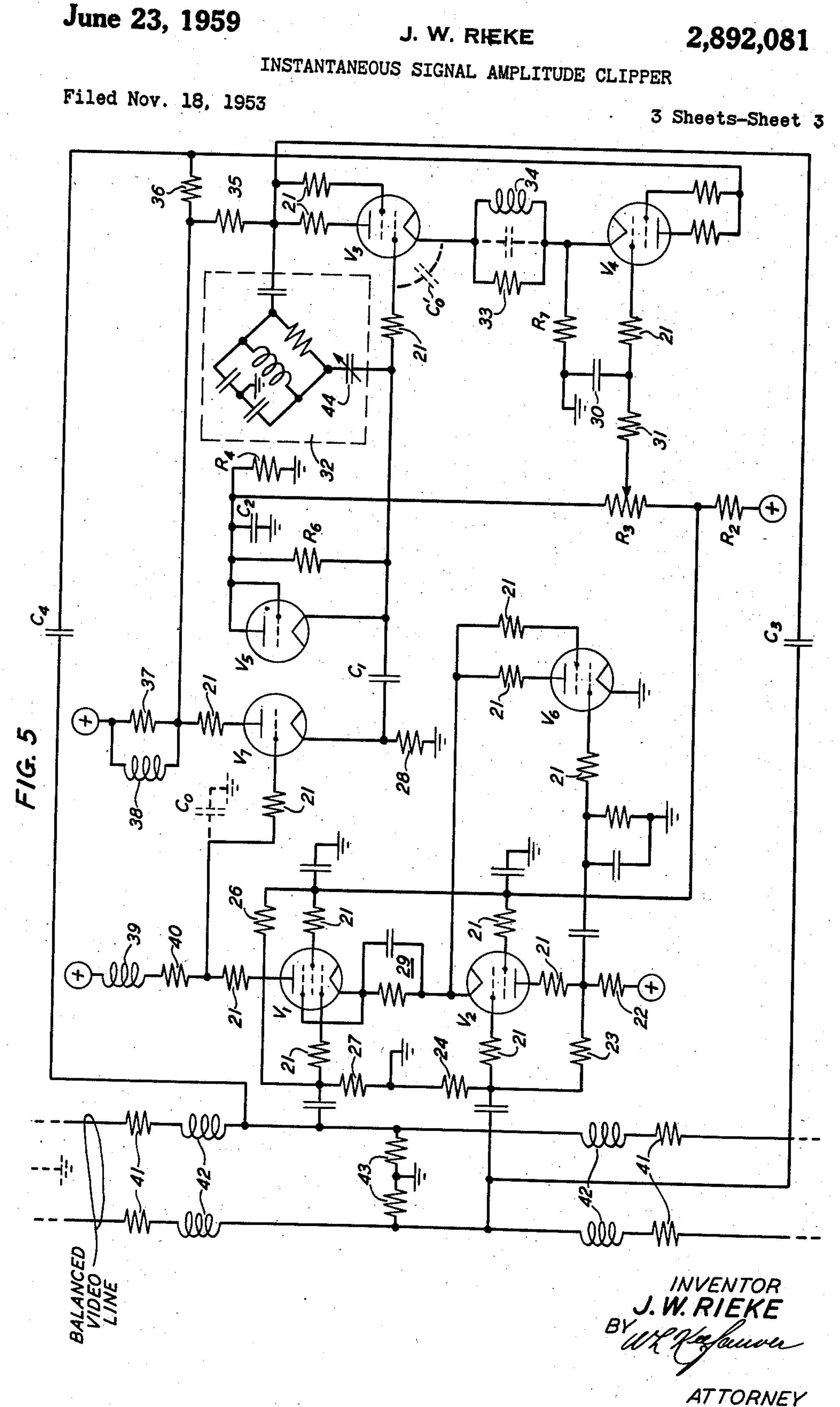
Fig. 5 illustrates in detail a video clipper for balanced lines which employs principles of the invention.

Details of a practical circuit are illustrated in Fig. 5. This circuit includes the elements, similarly designated, of Fig. 3 as modified by Fig. 4, plus other features to be described. In this instance, tubes V1 and V2 are a pentode and a tetrode, respectively, and tubes V6, V3, and V4 comprise tetrodes connected as triodes. Since the circuit is designed to handle a 4-megacycle video signal, very high gain vacuum tubes are employed so that the electrode capacitances and wiring inductance become important. These reactances, in fact, may produce undesirable oscillations. To prevent such oscillations, 30-ohm resistors 21 are connected in series with each plate, screen grid, and control grid to lower the "Q" of the wiring inductance and thereby dampen such oscillations.

To stabilize the balanced-to-unbalanced amplifiers V1 and V2, either against changes in tube or with time, direct-current negative feedback is provided in each of these tubes. In tetrode V2, negative feedback is provided by a simple resistance voltage divider comprising the plate load resistor 22 and resistors 23 and 24 which couple a portion of the output voltage directly back to the control grid. In pentode V1, however, negative feedback is provided by coupling screen grid voltage variations to the control grid by a resistance voltage divider comprising resistors $R_2$, 26, and 27. This screen grid connection avoids connecting an element to the plate of pentode V1 which would add additional stray capacitance to the output of this stage and tend to degrade the high frequency amplification of the signal.

In accordance with principles of the invention, a flat gain is maintained over the entire 4-megacycle signal band from the amplifier input to the clipper, i.e., from the grid of pentode V1 to the point at which the clipping level is established, namely, the grid of tetrode V3. To accomplish this, a cathode follower comprising a triode V7 having a cathode resistor 28 is interposed between the output of pentode V1 and the input to V3. This cathode follower serves to isolate the stray capacities such as $C_0'$ associated with tetrode V3 as well as stray capacities associated with capacitor $c_1$, triode V5, and resistor $R_6$ from the output of pentode V1. With the cathode follower, the stray capacities to ground between the cathode of triode V7 and the grid of tetrode V3 are shunting a relatively low impedance path and there tendency to degrade the signal at high frequencies is thereby reduced.

Even with the cathode follower, however, the output of pentode V1 is still loaded by the stray capacitance to ground $C_0$ of the remaining interstage elements. To compensate for the effect of this capacity, approximately six decibels of negative feedback are provided at low frequencies in pentode V1 by the RC network 29 connected to the cathode of this tube. At the higher frequencies at which $C_0$ becomes effective, the degeneration due to this RC network 29 is reduced so that the effect of each is to offset the other, thereby broadening the transmitted band width. The video signal is further peaked at high frequency by the coil 39 which is connected in series with the plate load resistor 40 of pentode V1.

Therefore, by means of the cathode follower V7, the RC network 29, and the coil 39, a flat gain is maintained across the signal band between the clipper input and the point at which the clipping threshold is established. This insures that signals over the entire band will be clipped at the same relative level.

The clamping diode V5, in this case a triode connected as a diode, the condenser $C_1$, the voltage divider comprising resistors $R_2$, $R_3$, $R_4$, perform the same functions as the similarly designated elements in Fig. 3, i.e., they serve to apply a differential bias to stage V3 and V4 so that tetrode V3 to which the video signal is applied will be cut off for all signals below the threshold level as determined by the setting of $R_3$. Signal excursions measured from peak to peak which exceed this level will cause the output stage V3—V4 to have an instantaneous output and the feedback by way of the coupling condensers $C_3$ and $C_4$ to the grids of stage V1 and V2 will reduce the impedance bridging the video line to a very low level. The RC filter comprising capacitor 30 and resistor 31 supplement $C_2$ in preventing video signals from reaching the grid of tetrode V4.

Even though tetrode V3 is cut off and video signals are by-passed from the control grid of tetrode V4 by the condenser $C_2$ and the resistance-capacitance filter 30—31, video signals below the threshold level will be coupled by parasitic capacities associated with tetrode V3 and, particularly, the stray capacitance $C_0'$ between grid and cathode, to the cathode of tetrode $V_4$ which is conducting and by way of its plate and the coupling condenser $C_4$ onto the video line as a distortion current. In effect, $C_0'$ places an unbalanced shunt from one side of the line to ground. To overcome this unbalance, a similar shunt is put on the other line by coupling the control grid and anode of tetrode V3 by a network 32 having transmission characteristics similar to the path comprising the stray capacitance $C_0'$, the parallel resistor 33 and inductance 34, and effective parasitic capacitance to ground of stage V3 and V4. This network, therefore, puts a similar current on the opposite line by way of coupling condenser C3 and in effect converts the distortion due to $C_0'$ into a high frequency longitudinal signal on the line. The balance may be adjusted by tuning the adjustable capacitor 44 in the network 32.

Since a high frequency longitudinal signal on the line is undesirable, another correction designed to reduce the amplitude of the longitudinal signal is also included. This correction is made by connecting the plate load resistors 35 and 36 to the plate of triode V7 instead of to B+ as would normally be done and by shunting the plate load resistor 37 of the cathode follower V7 with a peaking coil 38.

Figure 6:
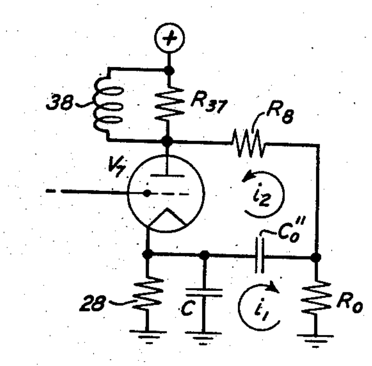
Fig. 6 is a simplified schematic diagram of certain circuitry in Fig. 5.

How correction is obtained may be understood by referring to Fig. 6. In this figure, $C_0''$ represents all the capacitive coupling from the grid of tetrode V3 to the plates of stage V3 and V4, and $R_8$ is the parallel combination of the plate load resistors 35 and 36 of stage V3 and V4. C is the net direct capacitance to ground from the cathode of triode V7 and $R_0$ is the total resistance to ground of the balanced line; $i_1$ represents the net longitudinal current placed on the video line by network 32 and stray capacitance $C_0'$. For longitudinal balance, i.e., cancellation, $i_2$ should equal $i_1$. In the simplified circuit of Fig. 6, this obtains when $$\frac{jwC_0''}{jwC_0''+jwC+1/R_{28}}=\frac{1/R_8}{1/R_8+1/R_{37}+\frac{1}{jwL_{38}}}$$

At very high frequencies, this becomes $$\frac{C}{C_0''}=\frac{R_8}{R_{37}}$$

while at low frequencies, the balance condition is $$C_0''R = \frac{L_{38}}{R_8}$$

This correction, therefore, attempts, to put on the line a signal equal in amplitude but out of phase with the longitudinal signal. The coil $L_{38}$ peaks the correction current $i_2$ at high frequencies to offset increased transmission at these frequencies through $C_0''$.

Figure 7:
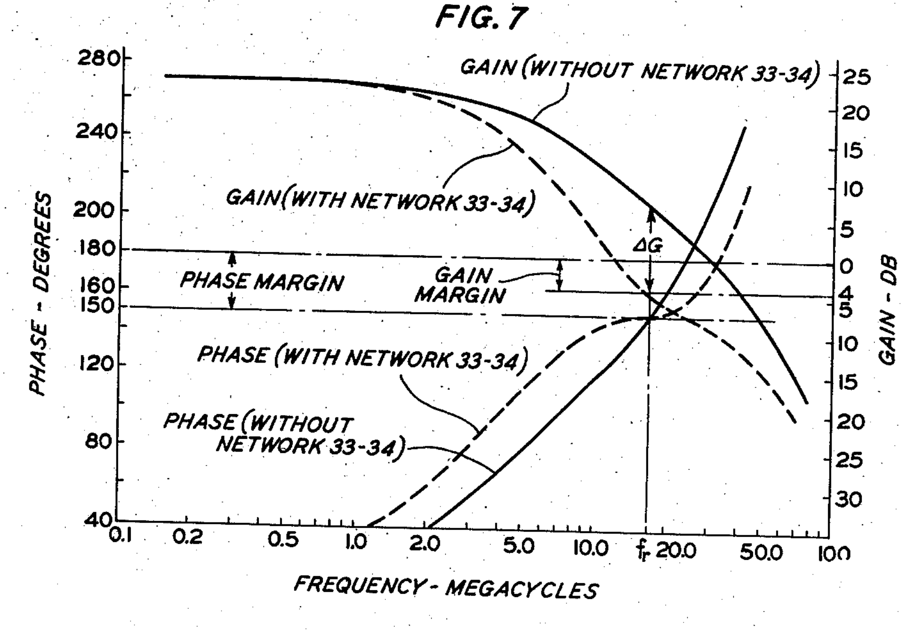
Fig. 7 shows phase-gain characteristics of the feedback loops and the effects of network 33—34 on these characteristics.

As with all amplifiers involving feedback, it is important to guard against instability. The feedback gain and phase characteristics are illustrated in Fig. 7. It may be seen from the gain characteristics plotted in the solid curve in Fig. 7 that the loop gain is large over the 4-megacycle band of the video signal. Over this same band, the phase shift is low and by inspection of either Fig. 3 or Fig. 5, it may be seen that a low phase shift is desirable from the standpoint of stability. Instability will, in fact, arise only when the phase shift around the loop approaches 180 degrees. The phase shift does approach 180 degrees at about 25 megacycles, at which frequency it may be noted that there is still appreciable loop gain, indicating instability at this frequency.

To prevent instability from arising at these higher frequencies, the loop gain is altered as shown by the dashed curves to provide a margin of loss at the high frequencies at which the phase around the loop approaches 180 degrees. At the same time a margin of phase angle below 180 degrees at lower frequencies where the loop gain exceeds the desired loss margin is also obtained.

The requirements are indicated in Fig. 7; $f_r$ is the frequency at which the phase curve crosses the desired phase margin arbitrarily chosen as 30 degrees and $\Delta_G$ is the gain in excess of the desired gain margin of 4 decibels at the frequency $f_r$.

To meet these requirements, an anti-resonant circuit tuned to $f_r$ is coupled between the cathodes of stage V3 and V4. This circuit, comprising resistor 33, coil 34, and associated stray capacities, provides degeneration at frequencies near $f_r$ without affecting the loop gain within the signal band. This circuit also provides the desired phase margin. The dotted characteristics in Fig. 7 illustrate the phase and gain characteristics with the addition of this stability network.

With normal transmission, the video clipper is inoperative and the impedance seen at its input terminals is high although not completely negligible. The resistive part of this impedance is due mainly to the plate load impedance of stage V3 and V4. Resistors 41 placed in series with each side of the video line together with the shunt resistance represented by these plate load impedances form T-shaped 62-ohm paths from each side of the line to ground and represent a loss of about one-half decibel on the 124-ohm video line. This loss is minor and avoids an impedance discontinuity at the clipper terminals which would interfere with proper transmission.

A further shunting impedance across the line arises from stray capacitance to ground at the inputs to stage V1 and V2. Uncompensated, these capacities would act as low-pass filters and tend to degrade high frequency transmission. The coils 42 are therefore connected in series with each line and are proportioned to maintain a flat gain over at least the signal band. The coils 42 and the stray capacities, in fact, form broad band filters.

Resistors 43 drain off any voltages arising from direct-current leakage through capacitors $C_3$ and $C_4$.

The invention, although described in relation to certain specific embodiments, should not be deemed limited to the circuits specifically described, since modifications of these embodiments as well as further embodiments will readily occur to one skilled in the art.

What is claimed is:

1. A clipper for attenuating instantaneous signal amplitudes of a high frequency signal on a balanced transmission line which exceed a threshold level comprising a broad band amplifier connected in shunt with said line for converting the balanced signal on said line into an unbalanced signal, biased means for passing only portions of said unbalanced signal corresponding to balanced signal amplitudes which exceed said level, means for applying said unbalanced signal to said biased means, means for converting the output of said biased means into a balanced signal, and means for applying said last-named balanced signal to the input of said amplifier.

2. In combination, a transmission path carrying electrical signals covering a broad band of frequencies and varying in amplitude, said signals having positive-going and negative-going sets of peaks, means for attenuating one of said sets of signal peaks of greater than a predetermined instantaneous amplitude with respect to the opposite set of said peaks, said attenuating means comprising a broad band amplifier, means for shunting the input of said amplifier across said path, a signal frequency shunt degenerative feedback path for said amplifier, means for disabling said feedback path for normal level signals comprising a translating device connected in said feedback path, and means for biasing said device to pass instantaneous signals greater than a first direct potential and beyond cut-off for all signals below said first direct potential, said biasing means comprising means for clamping said opposite set of peaks in said feedback path at a second direct potential which is less than said first direct potential.

3. In combination with a transmission line over which video signals balanced to ground are transmitted, said video signal including picture content signals and blacker-than-black synchronizing pulses, means for attenuating white picture content signals which exceed a desired threshold level comprising a first amplifier having a balanced input and an unbalanced output, means for connecting the input of said amplifier in shunt with said line, a second amplifier having an unbalanced input and a balanced output, means for applying the output of said first amplifier to the input of said second amplifier with white picture signals going positive and black picture signals going negative, means comprising a direct-current restorer for establishing a bias reference level for said second amplifier at the peaks of said synchronizing pulses, means for biasing said second amplifier unresponsive to instantaneous signal amplitudes less than said threshold level and responsive to instantaneous signal amplitudes greater than said threshold level, and means for applying the balanced output of said second amplifier to the balanced input of said first amplifier.

4. A shunt feedback amplifier comprising a first pair of vacuum tubes each having a cathode, control grid, and anode, means for applying input signals to said control grids, means connecting together said cathodes, means for deriving output signals from a first only of said first pair of tubes, a second pair of vacuum tubes each having a control grid, cathode, and anode, means comprising a common cathode impedance element for coupling the cathodes of said second pair of tubes, means for biasing the grid of the second of said second pair of tubes substantially more positive with respect to its cathode than the grid-cathode bias of the first tube of said second pair so that said second tube of said second pair is normally conducting and said first tube of said second pair is normally cut off, and means for coupling the outputs of said second pair of vacuum tubes to the control grids of said first pair of vacuum tubes.

5. The combination in accordance with claim 4, wherein said last-named means comprises means for capacitively coupling the output of the first tube of said second pair to the control grid of the second tube of said first pair, and means for capacitively coupling the output of the second tube of said second pair and the control grid of the first tube of said first pair.

6. In combination, a source of signals unbalanced with respect to ground, a transmission line balanced with respect to ground, and means for applying said signals to said line comprising a first and a second vacuum tube each having a control grid, cathode, and anode, and appreciable capacitive coupling from control grid to cathode at the frequency of said signals, means for applying said signals between the control grid and the cathode of said first tube, means connecting the anode of said first tube to one side of said line and the anode of said second tube to the other side of said line, means for biasing said first tube beyond cut-off for signal amplitudes below a predetermined level, and means for balancing metallic currents impressed on said line via said coupling when said first tube is cut off comprising means for capacitively coupling the control grid and anode of said first tube.

7. The combination in accordance with claim 6 and means for applying a portion of said signals reversed in phase to both sides of said transmission line.

8. In combination with a transmission line carrying a video frequency signal wave having positive-going and negative-going sets of signal peaks, an amplifier, means for shunting the input of said amplifier across said line, a broad band feedback circuit for said amplifier for controlling the input impedance thereof, biased means for blocking feedback in said circuit in response to video signals having a peak-to-peak amplitude less than a prescribed level but permitting feedback for video signals having a peak-to-peak amplitude greater than said level, and means for establishing a bias reference level for said biased means at one set of said signal peaks.

9. An amplitude clipper for video frequency signals comprising an amplifier, means for connecting the input of said amplifier in shunt relation with the transmission path carrying said signals, a shunt feedback circuit having a band width comparable to the band width of said video signals connected between the output and input of said amplifier, means connected in said feedback circuit for controlling feedback therethrough, and means comprising a direct-current restorer for biasing said last-named means to block feedback for signals having a peak-to-peak amplitude less than a prescribed value and to permit feedback for signals having a peak-to-peak amplitude greater than said value.

10. In a combination with a transmission line carrying video frequency signal waves balanced to ground, an amplitude clipper for attenuating abnormal surges on said signal wave comprising a first pair of space discharge devices each having a control grid, cathode, and anode, means for applying said signal waves in an out-of-phase manner to said control grids, means connecting together said cathodes, means for deriving an unbalanced signal from the anode of one of said devices, a second pair of space discharge devices each having a control grid, cathode, and anode, means for applying said unbalanced signal to the control grid of one of said second pair of space discharge devices, means for biasing said one device of said second pair beyond cut-off by an amount approximately equal to a prescribed clipping level, means for deriving a balanced output signal from the anodes of said second pair of space discharge devices, and means for degeneratively applying said balanced output signal to the control grids of said first pair of space discharge devices.

11. The combination in accordance with claim 10, wherein said biasing means comprises a direct-current restorer connected to the control grid of said one device of said second pair, and means for biasing said one device of said second pair beyond cut-off by an amount approximately equal to the desired maximum peak-to-peak amplitude of said video signal wave at the control grid of said one device.

12. A clipper for attenuating instantaneous signals having amplitude excursions which exceed a threshold level, said clipper comprising a transmission line for said signals, an amplifier having an input and an output and a feedback circuit for coupling said output to said input, means for connecting said input in shunt relation with said line, a translating device connected in said feedback circuit, and means for biasing said device beyond cut-off in response to signals having a peak-to-peak amplitude less than a prescribed level to disable said feedback circuit and for biasing said device into conduction in response to signals having a peak-to-peak amplitude greater than said level to enable said feedback circuit, said biasing means comprising a direct-current restorer for establishing a bias reference level at the negative-most peaks of said signals.

13. A clipper for attenuating instantaneous signal amplitudes of a high frequency signal on a balanced transmission line which exceed a threshold level, said clipper comprising a broad band amplifier connected in shunt with said line for converting the balanced signal on said line into an unbalanced signal, a first discharge device, means for normally biasing said device beyond cut-off in the absence of signals which exceed said level, means for applying said unbalanced signal to said discharge device for biasing said device into conduction in response to signals which exceed said level, a second discharge device, means for normally biasing said second device in a conducting condition, means responsive to conduction in said first device for coupling said discharge devices together to generate in the output of said second device voltage variations which are oppositely phased with respect to voltage variations in the output of said first device, and means for applying said oppositely phased voltage variations to the input of said amplifier in degenerative phase thereby reducing the input impedance of said amplifier.

References Cited in the file of this patent

UNITED STATES PATENTS

| | | |
|---|---|---|
| 1,863,895 | Bishop | June 21, 1932 |
| 1,985,353 | Rhodes | Dec. 25, 1934 |
| 2,204,726 | Davis | June 18, 1940 |
| 2,210,503 | Shaw | Aug. 6, 1940 |
| 2,226,238 | Doba | Dec. 24, 1940 |
| 2,286,442 | Schock | June 16, 1942 |
| 2,298,926 | Burrows | Oct. 13, 1942 |
| 2,390,502 | Atkins | Dec. 11, 1945 |
| 2,560,709 | Woodward | July 17, 1951 |
| 2,589,184 | Zinn | Mar. 11, 1952 |